(12) United States Patent
Buchanenko

(10) Patent No.: US 8,905,336 B2
(45) Date of Patent: Dec. 9, 2014

(54) METHOD FOR COMMINUTION OF MILL FEED

(75) Inventor: Michael Buchanenko, Mettmann (DE)

(73) Assignee: LOESCHE GmbH, Duesseldorf (DE)

( * ) Notice: Subject to any disclaimer, the term of this patent is extended or adjusted under 35 U.S.C. 154(b) by 112 days.

(21) Appl. No.: 13/375,453

(22) PCT Filed: Mar. 21, 2011

(86) PCT No.: PCT/EP2011/001396
§ 371 (c)(1),
(2), (4) Date: Nov. 30, 2011

(87) PCT Pub. No.: WO2011/131278
PCT Pub. Date: Oct. 27, 2011

(65) Prior Publication Data
US 2013/0048767 A1    Feb. 28, 2013

(30) Foreign Application Priority Data
Apr. 23, 2010    (DE) .......................... 10 2010 018 046

(51) Int. Cl.
*B02C 11/08* (2006.01)
*B02C 23/00* (2006.01)
*B02C 15/04* (2006.01)
*B02C 23/26* (2006.01)

(52) U.S. Cl.
CPC ................. *B02C 23/26* (2013.01); *B02C 15/04* (2013.01)
USPC .................................. 241/23; 241/48; 241/57

(58) Field of Classification Search
USPC ................. 241/48, 57, 23, 18, 24.1
See application file for complete search history.

(56) References Cited

U.S. PATENT DOCUMENTS

| 3,327,689 A | 6/1967 | Mittmann |
| 4,869,434 A | 9/1989 | Folsberg |

(Continued)

FOREIGN PATENT DOCUMENTS

| CN | 1184006 A | 6/1998 |
| CN | 100478294 C | 4/2009 |

(Continued)

OTHER PUBLICATIONS

International Search Report; PCT/EP2011/001396; Aug. 25, 2011.

(Continued)

*Primary Examiner* — Faye Francis
(74) *Attorney, Agent, or Firm* — Studebaker & Brackett PC

(57) ABSTRACT

The invention relates to a method for comminution of mill feed, in particular for the cement industry, wherein the grinding material is subjected in a mill, in particular an air swept roller mill, to a grinding-drying with supply of a hot gas, is classified and fed as a dust-gas mixture to a filter for dust separation.

In order to improve the energy balance and to save heat energy which is generated using a hot gas generator it is provided that fresh gas or fresh air, which is admixed for removal of the moisture of the grinding material in a predefinable portion to the recirculated hot gas or process gas, is preheated before admixing. The preheating of the fresh gas takes place in a heat exchanger through transfer of the heat energy of the process gas to be removed which is then discharged at a lower temperature to the environment. The preheated fresh gas is fed to the grinding circuit and admixed to the recirculation gas at the required points, for example as combustion air or via fresh air dampers, before or in the mill.

18 Claims, 1 Drawing Sheet

(56) References Cited

U.S. PATENT DOCUMENTS

| | | |
|---|---|---|
| 5,921,479 A | 7/1999 | Doenges et al. |
| 5,971,302 A | 10/1999 | Doumet |
| 6,685,117 B2 * | 2/2004 | Poeschl .................... 241/48 |
| 2002/0023976 A1 | 2/2002 | Poeschl |
| 2007/0178418 A1 | 8/2007 | Meyer et al. |
| 2010/0043675 A1 | 2/2010 | Lohle et al. |
| 2010/0102150 A1 | 4/2010 | Maeda et al. |

FOREIGN PATENT DOCUMENTS

| | | |
|---|---|---|
| CN | 101516517 A | 8/2009 |
| CN | 101252997 B | 5/2010 |
| DE | P39433DAZ | 4/1950 |
| DE | 1113534 | 9/1961 |
| DE | 1259003 | 1/1968 |
| DE | 3225989 A1 | 3/1983 |
| DE | 35 44 798 A1 | 4/1987 |
| DE | 19641781 A1 | 4/1998 |
| DE | 19836323 A1 | 2/2000 |
| EP | 0154281 A2 | 9/1985 |
| EP | 0842702 A1 | 5/1998 |
| JP | S57-140658 A | 8/1982 |
| JP | S58-64140 A | 4/1983 |
| JP | S59-21553 A | 2/1984 |
| JP | H03-115144 A | 5/1991 |
| JP | H05-269396 A | 10/1993 |
| JP | H09-117685 A | 5/1997 |
| TW | 222596 | 4/1994 |
| TW | 222596 A | 4/1994 |
| WO | 2005/070845 A2 | 8/2005 |
| WO | 2007/022837 A1 | 3/2007 |

OTHER PUBLICATIONS

International Preliminary Report on Patentability issued Oct. 23, 2012, which corresponds to International Application No. PCT/EP2011/001396 and is related to U.S. Appl. No. 13/375,453.

English language translation of the Examination report and the search report issued by the Taiwanese Patent Office on May 6, 2013; which corresponds to Taiwanese Patent Application No. 100112938 and is related to U.S. Appl. No. 13/375,453.

The First Office Action issued by the Chinese Patent Office; which corresponds to Chiense Patent Application No. 2011800029771 and is related to U.S. Appl. No. 13/375,453.

Summary of Japanese Office Action issued by the Japanese Patent Office on May 21, 2013; which corresponds to Japanese Patent Application No. 2012-523356 and is related to U.S. Appl. No. 13/375,453.

An Opposition Request issued by the European Patent Office on Aug. 22, 2014, which corresponds to European Patent Application No. 11 715 869.1 and is related to U.S. Appl. No. 13/375,453.

Henrich; "Moderne Mahlanlagen mit MPS-Mühlen in Extremadura"; ZKG International; vol. 59; No. 1-2006; Germany.

Beitz et al.; "Taschenbuch für den Maschinenbau"; Dubbel; ISBN 3-540-67777-1; Springer.

* cited by examiner

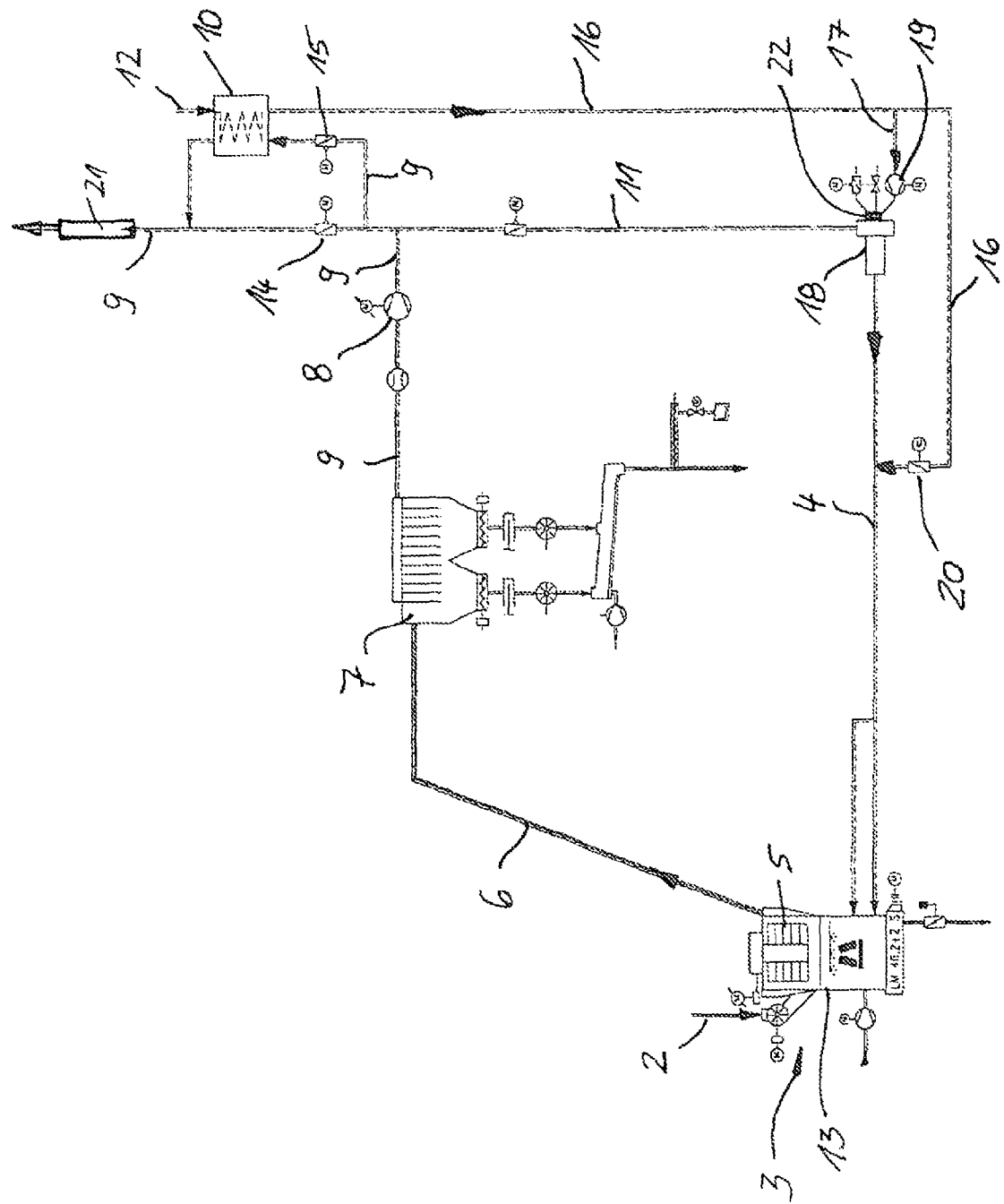

METHOD FOR COMMINUTION OF MILL FEED

BACKGROUND OF THE INVENTION (1) Field of the Invention

The invention relates to a method for comminution of mill feed, in particular for the cement industry as well as the steel industry, ore industry, coal gasification plants for the power plant industry and chemical industry.

The invention is provided in particular for clinker/slag grinding plants in which the grinding material supplied must be subjected to a grinding-drying process. The invention is also suitable for raw powder grinding plants of the cement industry.

(2) Description of Related Art

In cement/granulated blast furnace slag grinding plants of the cement industry which are operated in combination with a kiln line system of the clinker burning process, exhaust gases formed in a cement rotary kiln are generally available as a heat source for drying the grinding material.

DE 198 36 323 C2 describes composite grinding plants with air swept roller mills for grinding-drying processes.

Grinding-drying plants without external sources, such as for example rotary kiln exhaust gases or clinker cooler gases, require suitable devices, for example burners, in particular hot gas generators, to produce a hot process gas, for example hot air, which is fed to a mill for drying the moist grinding material and removing the quantity of water from the grinding circuit. The term "hot gas" or "process gas" is intended below to also include air or hot air and the term "fresh air" is always to include also fresh gases from other processes which are for example at ambient temperature.

For coal grinding plants in the ore industry, the metallurgical industry (blast furnace process) and coal gasification (power plants and chemical industry) there are in the majority of cases no external energy sources available for the drying process in the mill.

In order to guarantee drying during the grinding in a vertical air swept mill, for example an air swept roller mill, and to avoid falling below the dew point of the process gas in the mill circuit, a process gas temperature downstream of a classifier of approximately 80 to 100° C. is generally provided in a cement/granulated blast furnace slag grinding plant. The hot gases supplied in the mill must be dry enough to be able to absorb the moisture contained in the grinding material. For this reason it is not possible to convey the process air in a closed circuit but instead ambient air and/or dry hot gases must be constantly fed to the grinding circuit from externally. The supplied ambient air and/or the supplied hot gases must be discharged again at the flue together with the absorbed material moisture. Due to this type of process there is a large heat loss flow, as the gases removed at the flue have a temperature of around 80 to 110° C. and the heat content thereof cannot currently be further used in the grinding system.

The ambient air fed to the grinding system consists on the one hand of portions which are fed in a controlled way to the system, for example as combustion air or fresh air, and of portions which penetrate the system in an uncontrolled way due to leakages in the system (false air).

In particular in granulated blast furnace slag grinding plants a relatively large volume flow must be removed at the flue in order to remove the moisture contained in the feed material from the system. Granulated blast furnace slag has after granulation with water a moisture content of around 30%. After preliminary water removal, the moisture content of the granulated blast furnace slag which is fed to a vertical air swept mill can still be up to 15%.

The heat energy fed to the process gas or the hot air using a burner, for example a hot gas generator, is required for a large part for vaporisation of the water present in the grinding material supplied. Besides this, heat energy is required in order to heat the false air undesirably entering the grinding system from the ambient temperature to the mill outlet temperature, as the penetrated false air must be removed via the flue at this temperature. A portion of the supplied heat energy is also necessary in order to heat the combustion air required for the burner and the other fresh air fed to the system (ambient air) to the mill outlet temperature in order to be able to discharge this to the atmosphere again via the flue.

It is an object of the invention to create a method for comminution of material to be ground, in particular granulated blast furnace slag, a granulated blast furnace slag/cement mixture or a cement/additive mixture, which has an improved energy balance and thereby lower operating costs.

BRIEF SUMMARY OF THE INVENTION

The invention is based upon the basic idea of facilitating energy saving through an input temperature of the fresh air which is as high as possible and with moisture content which is as low as possible.

According to the invention the fresh air (ambient air) fed to a recirculation gas or a recirculation air is preheated as process gas before admixing it to the recirculation gas through transmission of the heat energy of the exhaust gas to be discharged to the environment. The heat of the exhaust gas discharged up to now via a flue into the environment is thus used to heat the fresh air (ambient air) which is to be supplied in a controlled way.

It is advantageous to feed fresh air from the environment and the hot exhaust gas of the grinding system after the filter for separation of the fine material from a fine material-gas-mixture and a mill fan to a device for transferring the quantity of heat of the exhaust gas to the fresh air.

Such a device is advantageously a gas/gas heat exchanger, in which the fresh air (ambient air) and the hot exhaust gas are conveyed for example in parallel flow, cross flow or counter flow. The hot exhaust gas is cooled with the transfer of heat energy to the fresh air which heats up and the exhaust gas then passes back into the exhaust gas line and can be discharged to the environment via a flue with a lower heat energy, whereby the heat energy to be fed in total to the grinding system is clearly reduced.

The fresh air preheated in the heat exchanger can be fed into the burner as combustion air and/or admixed to the recirculation gas before or in the mill.

The inventive efficient method is to be applied particularly advantageously in cement/granulated blast furnace slag grinding plants. A part of the hot exhaust air flow is branched off after the mill fan using at least one regulating damper and fed to the heat exchanger for preheating of fresh air from the environment. The ambient air thereby has a temperature and humidity determined by the ambient conditions. Through the preheating of the fresh air in the heat exchanger it is available to the grinding system with the ambient moisture but with a clearly increased temperature.

A considerable advantage of the inventive energy efficient grinding method consists in that in the heat exchanger merely the heat energy is exchanged between the two gas flows of the hot exhaust air and the fresh air but not the moisture of the exhaust air flow.

The preheated fresh air is fed to the burner for example of a hot gas generator as combustion air via a fresh air fan specific to the burner in a controlled way. A fresh air damper is provided before the mill in the recirculation line in order that the additional fresh air necessary for the process can be supplied in a controlled manner.

It is advantageous that the heat exchanger can be integrated with the lowest space requirement into the grinding plant and only few additional pipelines are required between the burner of the hot gas generator, the flue and the recirculation line for realisation of the heat recovery device in the grinding plant.

It is useful if the heat exchanger comprises a condensate tray for condensate from the process gas which can be arranged below the heat exchanger. The condensate collected can be discharged to the waste water system or reused as mill injection water. Recycling of the condensate as mill injection water leads to an advantageous reduction in the water requirement of the plant.

The inventive method described thus far relates merely to the preheating of the quantity of ambient air fed to the system, which already leads to the aforementioned advantages.

In an extended variant of the inventive method the heat energy of the hot exhaust air can additionally be used to replace a part of the recirculation gas by preheated fresh air with the low moisture contained therein. A substantially lower dew point can thus be achieved in the process gas circuit so that the temperature after the mill or the classifier can be reduced, which in turn leads to a further energy saving of the grinding system.

A further advantage of the substitution of recirculation gas through preheated fresh air consists in a reduction of the moisture of the hot gas fed to the mill. As a result of the entry of the drier gas into the mill there is an improved substance transition of the water contained in the feed grinding material into the gas phase. As a result of this the mill inlet temperature of the gas can be decreased and this leads once again to a reduction in the energy demand. Since in the known way the density of a moist gas is smaller than that of a dry gas, the carrying capacity of the gas for the grinding material transport increases. The gas flow to be conveyed through the mill can thereby be reduced in terms of quantity. Advantages follow also as a consequence of an improved quiet (smooth) running of the mill. In an extreme case it is possible to replace the recirculation gas completely by preheated fresh air (ambient air) so that the recirculation line can be completely omitted.

A further advantage of the system follows when the false air which has penetrated in an uncontrolled way into the system thus far is successfully reduced, as it would then be possible to also supply this ambient air in a controlled way and preheated via the heat exchanger to the system.

BRIEF DESCRIPTION OF THE DRAWING

FIGURE shows a flow-sheet of a grinding plant of the invention.

DETAILED DESCRIPTION OF THE INVENTION

The invention is explained further below by reference to an example embodiment. The associated drawing shows a flow-sheet of a grinding plant with a mill 3, a classifier 5, a filter 7 and a subsequent mill fan 8 and also with a hot gas generator 18 for generating hot gas 4 or hot air.

The mill 3 is a vertical air swept mill 13 with an integrated classifier 5. Hot gas 4 or hot air is fed as process gas to the milling chamber of the mill 3 in order to dry moist mill feed 2, for example granulated blast furnace slag or a granulated blast furnace slag/cement mixture or a cement/additive mixture during the comminution. A dust-gas-mixture 6 is conveyed in a connection line, due to the underpressure generated by the mill fan 8, after the mill 3 with the classifier 5 into the filter 7, where the fine material is separated and subsequently the hot exhaust gas 9 is fed via the mill fan 8 to a flue 21 for discharge to the environment. Cement can hereby also be cement clinker.

A portion of the hot exhaust gas or the hot exhaust air 9 is branched off from the exhaust gas line and fed as recirculation gas 11 to a device 18 for heating, for example a hot gas generator.

According to the inventive idea of the reduction of the energy requirement a predefinable portion of the hot exhaust gas flow 9 is fed before the flue to a heat exchanger 10. Fresh air 12 from the environment is fed to the heat exchanger 10 so that a transfer of the heat energy from the hot exhaust air 9 to the fresh air 12 takes place, which is then fed as preheated fresh air 16 to the burner fresh-air fan 19 as combustion air 17 and is also admixed via a regulating or fresh air damper 20 to the heated recirculation gas 11 after the hot gas generator 18 but before the mill 3. It should be pointed out that it is insignificant for the inventive idea how and in what manner the hot gas generator is connected to the grinding circuit. It is significant merely that the air fed to the hot gas generator is preheated in a heat exchanger. A supply of the preheated fresh air 16 into the recirculation line 11 via the regulating damper 20 is also possible before the hot gas generator 18.

As the hot exhaust air 9 cannot be conveyed through the heat exchanger 10 in all operating states, particularly with different quantities, a further regulating damper 15, in addition to a regulating damper 14 in the exhaust air line to the flue 21, is arranged in a feed line for a branched off exhaust air flow 9. Both dampers 14, 15 are connected in parallel so that the pressure loss is not increased.

The preheated fresh air 16 is fed via a burner-own fresh air fan 19 to the burner 22 of the hot gas generator 18.

It should be pointed out once again that the illustrated flow-sheet merely shows a possible circuit of a plant. It is significant to the inventive idea that in case of cement/granulated blast furnace slag grinding plants a portion of, or all, the ambient air which is fed to the grinding circuit is previously preheated in a heat exchanger 10.

In an example case, granulated blast furnace slag as mill feed or material to be ground 2 with a water content of 12% and a temperature of 10° C. was fed to the air swept roller mill 13. A hot gas generator 18 lying in the recirculation line was examined as a device 18 for heating the hot air 4 to be fed to the air swept roller mill 13. According to the heat balance, 46,879 m$^3$/h fresh air was to be supplied. The overall heat flow to be supplied was 43.03 GJ/h. The exhaust air flow to be discharged at the flue amounted, without heat recovery according to the described new method respectively, to 142,946 m$^3$/h at a temperature of 98.2° C. and a dew point of 58.1° C.

With a heat exchanger 10 designed as a cross flow plate heat exchanger for energy reduction from the hot exhaust gas 9 to be discharged to the environment, the fresh air 12 was preheated from an inlet temperature before the heat exchanger 10 of 10° C. to 82.1° C. after the heat exchanger 10. Merely 100,440 m$^3$ of exhaust gas 9 was required, which was cooled from 98.2° C. to 88.9° C. The remaining exhaust air flow 9 was bypassed in the flue 21. With the fresh air 16 preheated to 82.1° C. the heat flow to be generated in the hot gas generator 18 was reduced to 38.62 GJ/h. This leads in case of use of heavy oil as the fuel of the burner 22 of the hot gas generator 18 to a fuel reduction of approximately 110 kg/h and thus to a saving of approximately EUR 20,000 per month.

It is possible with the inventive efficient grinding method using a heat exchanger to achieve a considerable energy saving with relatively low investment and hence a reduction in the operating costs in the comminution of moist grinding material.

The invention is not limited to a grinding-drying in a vertical air swept mill, but is instead also suitable for grinding processes with other mill types, for example roller pan mills, tube mills and/or two-stage grinding processes with a hot process gas conveyed in circuit. Advantageous applications of the method are, besides the cement industry with granulated blast furnace slag/cement and raw powder grinding, also coal grinding plants in the ore and smelting industry and coal gasification.

The invention claimed is:

1. Method for comminution of mill feed, wherein the mill feed is subjected to a grinding-drying process in a mill with supply of a hot gas, is classified and fed as dust-gas mixture to a filter for dust separation, and
    wherein after the filter and a mill fan the hot gas is branched off as hot exhaust gas and discharged via a flue to the environment, while a portion of the hot exhaust gas is fed back to the mill as recirculation gas after mixing-in of fresh air,
    wherein
    at least a portion of the fresh air fed to the grinding-drying process is preheated before admixing to the recirculation gas,
    for the preheating of the fresh air at least a portion of, the hot exhaust gas to be fed to the flue is used and
    the hot exhaust gas used for preheating the fresh air is discharged at a lower temperature to the environment via the flue.

2. Method according to claim 1,
    wherein
    the fresh air and the hot exhaust gas are fed to a device for transfer of the heat energy of the hot exhaust gas to the fresh air.

3. Method according to claim 1,
    wherein
    the fresh air and the hot exhaust gas are fed to a heat exchanger and conveyed in parallel flow, cross flow or counter flow and heated or cooled respectively.

4. Method according to claim 3,
    wherein
    cement clinker as mill feed is subjected to the grinding-drying process in an air swept roller mill,
    hot air is supplied as hot gas, and
    a portion of the hot exhaust air flow is branched off after the mill fan using at least one regulating damper and fed to the heat exchanger for preheating of fresh air which has as ambient air a temperature and moisture determined by the ambient conditions.

5. Method according to claim 4,
    wherein
    a controllable fresh air volume flow is fed to the heat exchanger and preheated therein, and
    at least a portion of the preheated fresh air is fed to a device for heating the recirculation air as combustion air.

6. Method according to claim 4,
    wherein
    at least a portion of the hot exhaust air flow is branched off using two regulating dampers which are connected in parallel and is fed to the heat exchanger.

7. Method according to claim 4,
    wherein
    as device for heating the recirculation air a hot gas generator with a burner is used, to which the preheated fresh air is fed as combustion air via a burner-own fresh air fan.

8. Method according to claim 4,
    wherein
    as heat exchanger a rotor heat exchanger with storage medium or a plate heat exchanger is used and condensate arising is collected from the exhaust air below the heat exchanger.

9. Method according to claim 8,
    wherein
    the condensate collected is discharged to the waste water system or reused as mill injection water.

10. Method according to claim 8,
    wherein
    in order to reduce the dew point and the temperature of the hot gas after the classifier and to reduce the moisture content of the gas before the mill, the recirculation gas is at least partially replaced by the fresh air preheated in the heat exchanger.

11. Method according to claim 1,
    wherein
    the hot gas or the hot air is fed to the mill with a temperature >150° C.

12. Method according to claim 3,
    wherein
    fresh air which is fed to the heat exchanger with an ambient temperature of approximately 10° C. and a relative moisture content of approximately 70% is preheated to a temperature of approximately 80° C. and a relative moisture content of 1% and simultaneously the exhaust air is cooled in the heat exchanger from approximately 109° C. to approximately 90° C.

13. Method according to claim 10,
    wherein
    false air penetrating as a consequence of an underpressure prevailing in the mill, classifier, filter and connection lines is replaced at least partially by preheated fresh air.

14. Method according to claim 1,
    wherein
    all the fresh air fed to the process is preheated before being fed into the grinding-drying process before admixing to the recirculation gas.

15. Method according to claim 1,
    wherein
    all the hot exhaust gas to be fed to the flue is used for the preheating of the fresh air and the hot exhaust gas used for preheating the fresh air is discharged at a lower temperature to the environment via the flue.

16. Method according to claim 3,
    wherein
    cement clinker together with additives and granulated blast furnace slag as mill feed is subjected to the grinding-drying process in an air swept roller mill.

17. Method according to claim 4,
    wherein
    the preheated fresh air is admixed to the recirculation air after a device for heating the recirculation air.

18. Method according to claim 1,
    wherein the comminution of mill feed is used
    in the cement industry, the steel industry, in coal gasification plants, in the power plant industry and chemical industry respectively.

* * * * *